(12) United States Patent
Kashima (10) Patent No.: US 10,938,507 B2
(45) Date of Patent: Mar. 2, 2021

(54) COMMUNICATION APPARATUS

(71) Applicant: DENSO CORPORATION, Kariya (JP)

(72) Inventor: Hideki Kashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/874,784

(22) Filed: May 15, 2020

(65) Prior Publication Data

US 2020/0382238 A1    Dec. 3, 2020

(30) Foreign Application Priority Data

May 29, 2019 (JP) .............................. JP2019-100302

(51) Int. Cl.
*H04L 1/00* (2006.01)
(52) U.S. Cl.
CPC .......... *H04L 1/0023* (2013.01); *H04L 1/0002* (2013.01); *H04L 1/0046* (2013.01)

(58) Field of Classification Search
CPC .... H04L 1/0023; H04L 1/0046; H04L 1/0002
USPC .................................................. 375/224, 225
See application file for complete search history.

(56) References Cited

U.S. PATENT DOCUMENTS

2012/0293230 A1    11/2012  Mori et al.
2019/0385057 A1*   12/2019  Litichever ................ G06N 3/08

* cited by examiner

*Primary Examiner* — Fitwi Y Hailegiorgis
(74) *Attorney, Agent, or Firm* — Posz Law Group, PLC (57) ABSTRACT

In a communication apparatus, a specific bit is detected from a communication data decoded in a low-speed state of a communication speed. The specific bit is a bit having undergone an inverse change in a logical value. A signal waveform of the communication signal is acquired, which is recorded in a memory and corresponds to the specific bit. Then, a sampling point of the communication signal in a high-speed state of the communication signal is calculated based on (i) the acquired signal waveform and (ii) a logical value of the specific bit.

9 Claims, 9 Drawing Sheets

COMMUNICATION APPARATUS

CROSS REFERENCE TO RELATED APPLICATION

The present application claims the benefit of priority from Japanese Patent Application No. 2019-100302 filed on May 29, 2019. The entire disclosure of the above application is incorporated herein by reference.

TECHNICAL FIELD

The present disclosure relates to a communication apparatus that restores data from a communication signal transmitted with a communication speed switched.

BACKGROUND

In this type of communication apparatus, at the time when the signal level of the communication signal changes from high to low or from low to high, a part of the signal energy is reflected to cause the received signal to exhibit an overshoot or undershoot to generate a waveform distortion.

This waveform distortion is so-called ringing. When ringing occurs, the communication data may not be normally restored on the receiving side of the communication apparatus.

SUMMARY

According to an example of the present disclosure, a communication apparatus in a communication system is provided for receiving, via a transmission path, a communication data transmitted from a plurality of transmission nodes to a transmission path common to each transmission node.

In the communication system using the communication apparatus of the present disclosure, a communication data is transmitted from a plurality of transmission nodes, the communication data having a frame structure in which an arbitration area is added before a data area. When a plurality of transmission nodes simultaneously start transmission, one transmission node acquires a transmission right in the arbitration area and continues transmission of communication data. The communication speed is switched to make the speed higher in the data area. In the communication apparatus, a specific bit is detected from a communication data decoded in a low-speed state of a communication speed. The specific bit is a bit having undergone an inverse change in a logical value. A signal waveform of the communication signal is acquired, which is recorded in a memory and corresponds to the specific bit. Then, a sampling point of the communication signal in a high-speed state of the communication signal is calculated based on (i) the acquired signal waveform and (ii) a logical value of the specific bit.

BRIEF DESCRIPTION OF DRAWINGS

The objects, features and advantages of the present disclosure will become more apparent from the following detailed description made with reference to the accompanying drawings. In the drawings.

DETAILED DESCRIPTION

Hereinafter, an embodiment of the present disclosure will be described with reference to the drawings.

[1. Embodiment]

[1-1. Overview of Communication System]

Figure 1:
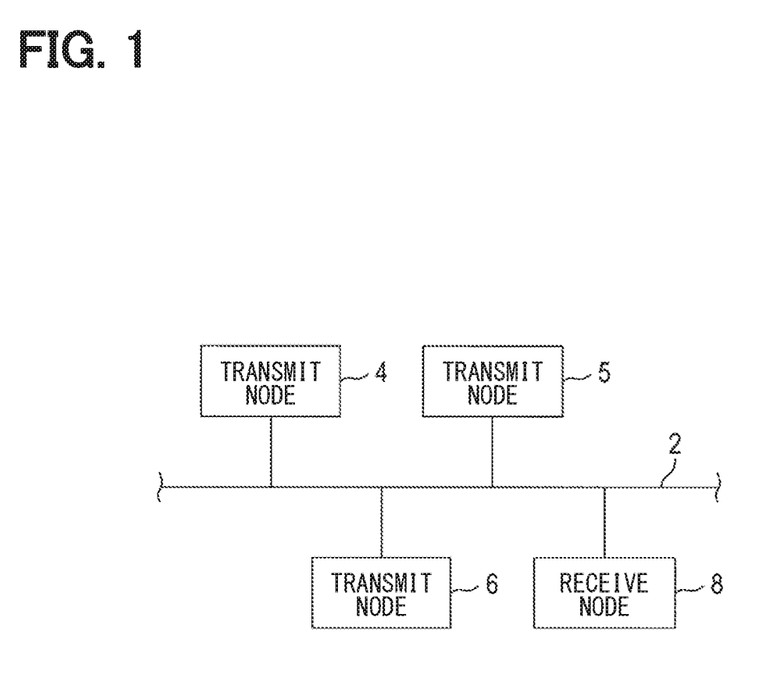
FIG. 1 is a block diagram illustrating an overall configuration of a communication system according to an embodiment.

As shown in FIG. 1, a communication system according to a present embodiment configures an in-vehicle network for transmitting and receiving data between various in-vehicle devices such as a sensor mounted on a vehicle and an ECU for vehicle control. As shown in FIG. 1, the communication system includes a transmission line 2 including a pair of communication lines.

A plurality of transmission nodes 4, 5, 6 and a reception node 8 are connected to the transmission path 2 in a bus type. Each of the transmission nodes 4 to 6 converts transmission data into a differential signal and transmits the differential signal to the transmission path 2. The reception node 8 receives the differential signal transmitted via the transmission path 2 and restores the received data. Note that although FIG. 1 illustrates three transmission nodes 4, 5, 6 and one reception node 8, those are just examples and the number of transmission nodes and/or the number of reception nodes may thus be changed as needed.

The transmission nodes 4 to 6 and the reception node 8 are configured to perform communication according to the CANFD protocol. For this reason, the transmission nodes 4 to 6 transmit communication data having a frame structure defined by the CANFD protocol, as shown in FIG. 2.

The CANFD protocol is a well-known communication protocol that extends the CAN protocol so that more data can be transferred at high speed. CAN is an abbreviation of Controller Area Network and is a registered trademark. CANFD is an abbreviation for CAN with Flexible Data rate.

Figure 2:
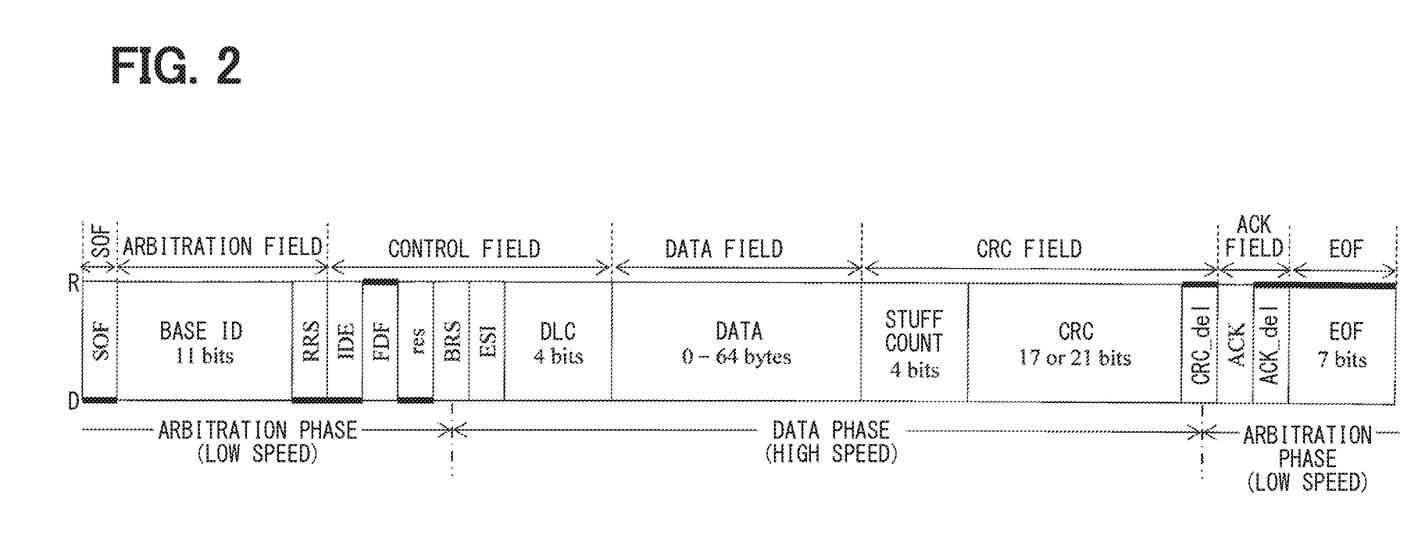
FIG. 2 is an explanatory diagram illustrating a data structure of a communication data transmitted from a transmission node in FIG. 1.

In the CANFD protocol, in the frame structure shown in FIG. 2, the data phase from the "BRS" bit to the "CRC delimiter" bit has a higher bit rate than the arbitration phases before and after the data phase, allowing the high-speed communication to be performed.

The arbitration phase has the same bit rate as CAN; the arbitration phase has a communication speed lower than that of the data phase. The arbitration phase before the data phase corresponds to an arbitration area of the present disclosure.

The communication arbitration priority is designed to be determined in the "Arbitration field" that includes the 11-bit "BASE ID" and "RRS" bit.

That is, suppose a case where a plurality of transmission nodes start transmission substantially at the same time or at almost the same time. In such a case, in the arbitration area corresponding to "Arbitration field" in the arbitration phase, the transmission node with a highest priority acquires a transmission right and continues data transmission, while the other transmission nodes stop data transmission.

Further, the reception node 8 receives a differential signal transmitted via the transmission path 2 and restores the "Arbitration field", thereby determining that the arbitration has been completed. Then the reception node 8 identifies the transmission node (i.e., the transmission node acquiring the transmission right) and the type of communication data in the data phase from the restored "BASE ID", and continues the data reception.

Figure 3:
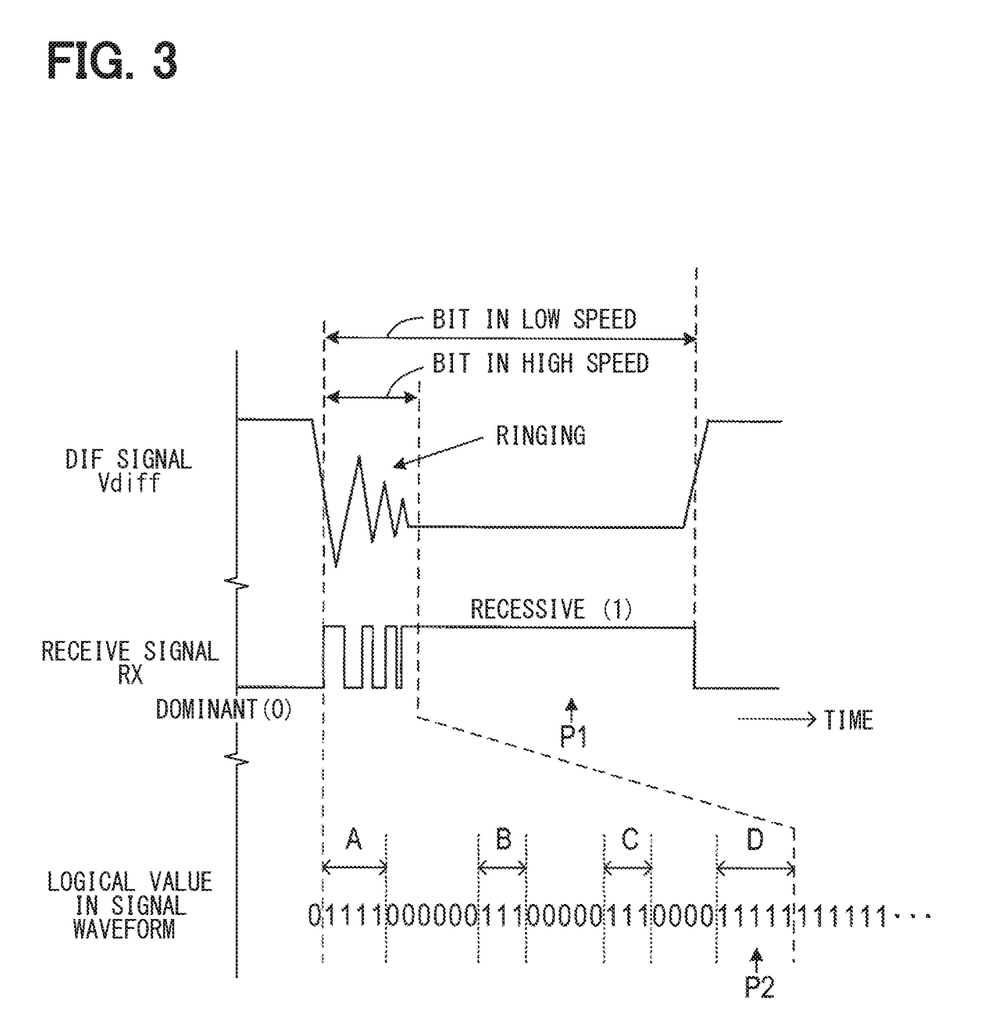
FIG. 3 is an explanatory diagram illustrating a differential signal, a reception signal, and logical values of a signal waveform of a specific bit that has a logical value of communication data having been inverted.

Next, refer to FIG. 3. When the logical value of the communication data is "0", the transmission nodes 4 to 6 set a voltage potential difference (which may also be referred to as a potential difference or a voltage difference) between the two signal lines included in the transmission path 2 to a high level as a dominant. When the logical value is "1", the voltage potential difference is set to a low level as a recessive. Refer to FIG. 3. Note that the transmission signal (i.e., a differential signal or a voltage differential signal Vdiff) transmitted through the transmission path 2 exhibits or undergoes an occurrence of ringing when the communication data is inverted from the dominant of the logical value "0" to the recessive of the logical value "1" or when it is inversed in the opposite direction.

Further, regardless of whether the communication speed is high or low, such ringing similarly occurs immediately after the logical value of the communication data is inverted. In the low-speed communication, each bit of the communication data may be normally decoded by sampling the differential signal Vdiff at a predetermined sampling point P1 in synchronization with the cycle of each bit of the communication data. In contrast, in the high-speed communication, decoding may not be performed normally.

That is, in the high-speed communication, the width of one-bit communication data is narrower and the area where ringing occurs in the one-bit differential signal Vdiff becomes relatively wider than in the low-speed communication. If the sampling point P2 is preset in advance, communication data may not be normally decoded.

In the high-speed communication, in order to normally restore communication data by the reception node 8, the sampling point P2 in the differential signal Vdiff for each bit needs to be appropriately set according to the level change of the differential signal Vdiff generated due to an occurrence of the ringing.

Thus, in the present embodiment, the reception node 8 is configured to store a signal waveform of a specific bit during the low-speed communication. Such a specific bit is defined as a bit having undergone a change or an inverse change in a logical value. That is, the logical value of a specific bit is in inverse relation to the logical value of a previous bit immediately before the specific bit, or the logical value of the specific bit has been inverted or changed from the logical value of the previous bit.

Herein, naturally, a bit (i.e., a binary digit) has one of two logical values of a first logical value and a second logical value. In other words, a specific bit may be defined as a (present) bit having a present logical value during a low-speed communication immediately after a previous bit having a previous logical value during the low-speed communication; the present logical value of the specific bit is one of the two logical values and the previous logical value of the previous bit is the other one of the two logical values. That is, when the previous logical value of the previous bit is "0", the present logical value of the specific bit is "1"; when the previous logical value of the previous bit is "1", the present logical value of the specific bit is "0".

Specifically, in the present embodiment, the reception node 8 stores a signal waveform of a specific bit, which appears after the completion of the arbitration between the transmission nodes, during the low-speed communication. Such a specific bit corresponds to the "FDF" bit appears after "Arbitration field" shown in FIG. 2; the "FDF" bit having a logical value "1" of recessive which has been inverted or changed from dominant of the bit (i.e., the "IDE" bit) previous to the "FDF" bit. In the present embodiment, as described later, the sampling point in the high-speed communication is set based on (i) the signal waveform and (ii) the logical value of the "FDF" bit serving as a specific bit. This is because the ringing is apt to occur when the communication data is inverted from the dominant of the logical value "0" to the recessive of the logical value "1" such as the logical value of the "FDF" bit.

Then, by comparing the logical value of the signal waveform with the logical value "1" of the "FDF" bit, a point is obtained at which the logical value of the signal waveform becomes "1" within a 1-bit period during high-speed communication. This point is set as a sampling point of the differential signal Vdiff in the high-speed communication.

As such the sampling point in the high-speed communication is set based on the signal waveform and the logical value of the "FDF" bit. This is because the ringing is apt to occur when the communication data is inverted from the dominant of the logical value "0" to the recessive of the logical value "1".

That is, the ringing is greater when the voltage potential difference of the differential signal Vdiff changes from high to low than when it changes from low to high. For this reason, the present embodiment uses a specific bit with a logical value having undergone an inverse change in which the voltage potential difference of the differential signal Vdiff changes from high to low. Thereby, a sampling point can be set to be suitable for decoding the logical value of each bit of communication data without being affected by ringing during the high-speed communication.

[1-2. Configuration of Communication Apparatus]

The following will describe the communication apparatus 10 configured to operate as described above with reference to FIGS. 4 and 5.

Figure 4:
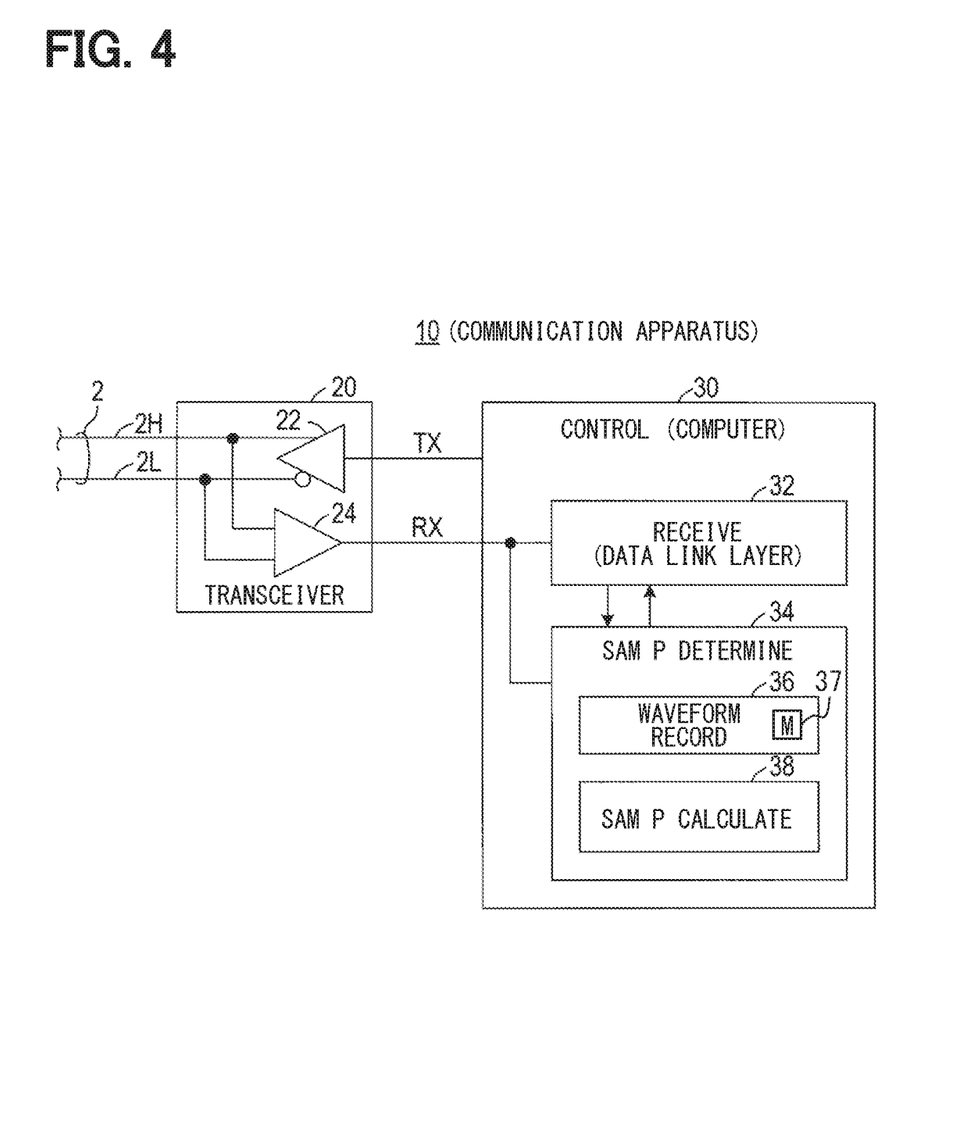
FIG. 4 is a block diagram illustrating a configuration of a communication apparatus having functions as a transmission node and a reception node in FIG. 1.

Refer to FIG. 4. The communication apparatus 10, which has functions as the transmission nodes 4 to 6 and the reception node 8, includes (i) a control circuit 30 and (ii) a transceiver 20 that is connected to a pair of communication lines 2H and 2L constituting the transmission path 2 to transmit and receive differential signals.

The transceiver 20 includes (i) a transmission circuit 22 as a driver and (ii) a reception circuit 24 as a receiver. The transmission circuit 22 outputs a differential signal Vdiff having a predetermined voltage potential difference to the transmission line 2 when the transmission signal TX output from the control circuit 30 is dominant, whereas the differential signal Vdiff having substantially zero voltage potential difference is output to the transmission line 2 when the transmission signal TX is recessive.

Note that the transmission circuit 22 outputs a signal obtained by inverting the output to the communication line 2H to the communication line 2L; thereby a differential signal Vdiff is generated in which the communication line 2H has a high voltage potential and the communication line 2L has a low voltage potential.

In addition, the reception circuit 24 inputs a reception signal RX to the control circuit 30. Such a reception signal RX shown in FIG. 3 becomes a low level when the voltage potential difference of the differential signal Vdiff transmitted via the transmission path 2 is equal to or greater than a predetermined threshold value, and a high level otherwise (i.e., when the voltage potential difference of the differential signal Vdiff is less than the predetermined threshold value).

The control circuit 30 serving as a communication controller is configured as a computer (i.e., microcomputer). As an example of the present embodiment, such a computer may include a CPU, a ROM, a RAM, and the like. At the time of transmission, transmission data having the frame structure shown in FIG. 2 is generated. When the logical value of the transmission data is "0" and is dominant (D), a low-level transmission signal TX is output to the transmission circuit 22. Thereby, a differential signal Vdiff having a predetermined voltage potential difference is output to the transmission line 2.

When the logical value of the transmission data is "1" and recessive (R), the high-level transmission signal TX is output to the transmission circuit 22. Thereby, a differential signal Vdiff having substantially zero voltage potential difference is output to the transmission line 2.

Further, at the time of transmission, the control circuit 30 monitors the differential signal Vdiff flowing through the transmission line 2 by sampling the reception signal RX. If the monitored differential signal Vdiff is dominant even though the transmission signal TX is recessive, the transmission is stopped.

As a result, when some of the plurality of transmission nodes 4 to 6 connected to the transmission path 2 start transmission, arbitration is performed in the "Arbitration field". One transmission node (which may also be referred to a priority transmission node) that has acquired the priority (i.e., transmission right) by arbitration can continue transmission.

When sampling the reception signal RX in the low-speed communication, the control circuit 30 samples the reception signal RX at a preset sampling point P1 set in advance. In contrast, in the high-speed communication, the reception signal RX is sampled at a sampling point P2 set by a sampling point calculation unit 38 described later.

As described above, the sampling point P2 for high-speed communication is set based on (i) the logical value "1" of the "FDF" bit, which is a specific bit obtained after arbitration during low-speed communication, and (ii) the logical value of the reception signal RX representing the waveform of the differential signal Vdiff of "FDF" bit.

Next, the control circuit 30 includes a reception unit 32 for data link layer. The reception unit 32 decodes the logical value of each bit of the received data by sampling the reception signal RX input from the reception circuit 24 in the transceiver 20. The reception unit 32, which also be referred to as a reception module 32 or a reception circuit 32, may be configured as hardware circuitry without a CPU. However, there is not need to be limited thereto. For instance, some of the functions of the reception unit 32 may be achieved by, in the control circuit, the CPU executing a program stored in the ROM or RAM, along with the related hardware circuits or components.

The reception unit 32 needs to switch the sampling point of the reception signal RX from the reception circuit 24 according to the communication speed of the communication data. For this reason, the control circuit 30 further includes a sampling point determination unit 34 that switches the sampling point of the reception signal RX according to the communication speed.

The sampling point determination unit 34 has not only a function of switching the sampling point at a time when the communication speed is switched within one frame of the communication data after starting the reception of the communication data, but also a function of setting the sampling point P2 in the high-speed communication.

In order to realize the function of setting the sampling point P2, the sampling point determination unit 34 is provided with a waveform record unit 36 and a sampling point calculation unit 38 along with related hardware circuits or components such as memory 37.

The waveform record unit 36 records a signal waveform of the specific bit (i.e., "FDF" bit) after the "BASE ID" that is used for arbitration in the reception data obtained by the low-speed communication. As shown in the lower part of FIG. 3, the recording of signal waveforms is performed by (i) sampling the reception signal RX at a predetermined unit time, which is a cycle shorter than the fluctuation cycle of the signal waveform due to ringing, and (ii) recording the logical values of the signal waveforms obtained by the sampling.

Next, as illustrated in the lower part of FIG. 3, the sampling point calculation unit 38 extracts the periods A, B, C, and D in which the logical values match the logical value of the "FDF" bit within the period corresponding to one bit during high-speed communication based on the logical values of the signal waveforms recorded in the waveform record unit 36.

Then, from among the extracted periods A, B, C, and D, the sampling point calculation unit 38 selects and sets a sampling point P2 as a timing suitable for sampling the reception signal RX for each bit during high-speed communication as the subsequent communication.

[1-3. Reception Process]

Figure 5:
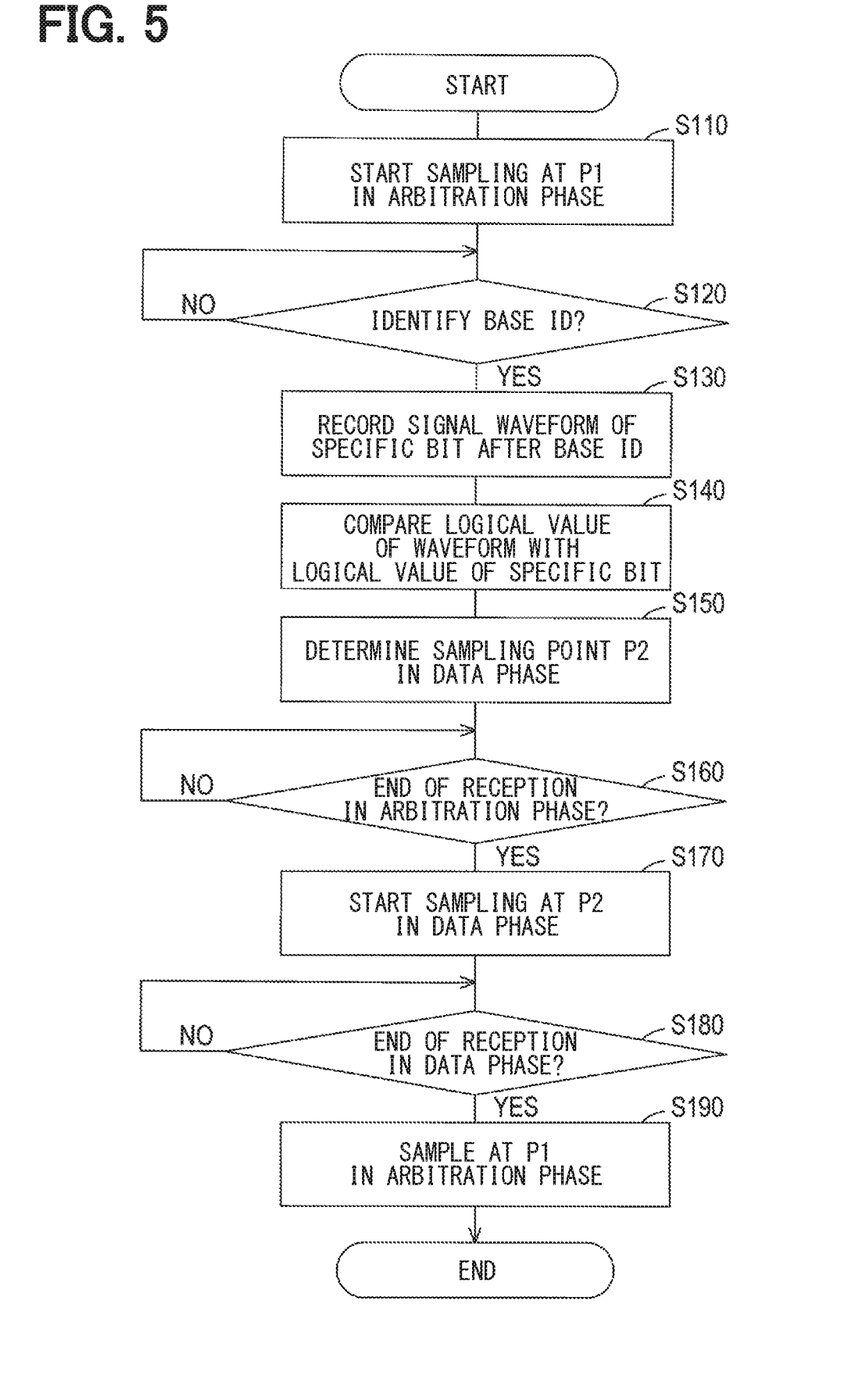
FIG. 5 is a flowchart illustrating a reception process executed by a control circuit in FIG. 4.

Functions of the waveform record unit 36 and the sampling point calculation unit 38 are realized by the control circuit 30 executing a reception process shown in FIG. 5. As an example of the present embodiment, the reception process is achieved by the CPU executing a program stored in a nonvolatile memory such as a ROM, along with the reception unit 32 and related hardware circuits or components such as the memory 37.

As shown in FIG. 5, in the reception process, first, in S110, the CPU causes the reception unit 32 to sample the reception signal RX at a preset sampling point P1 for low-speed communication.

Next, in subsequent S120, it is determined whether the "BASE ID" has been identified from the reception data obtained by the sampling operation in the reception unit 32, and the process stands by until the "BASE ID" is received.

That is, the received data has the frame structure shown in FIG. 2. If the "BASE ID" can be identified after the start of reception, it can be determined that the arbitration has been completed among the plurality of transmission nodes 4 to 6. Thus, it is determined in S120 whether the identification of the "BASE ID has been completed.

In S120, when it is determined that the "BASE ID" has been identified, in other words, the arbitration has been completed, the process proceeds to S130. Herein, the reception period of a specific bit (i.e., "FDF" bit) received after the identification of the "BASE ID" is detected.

Further, in S130, during the reception period of the detected specific bit, the reception signal RX is sampled at the above-described waveform detection cycle, thereby detecting the signal waveform of the specific bit and storing it in a memory 37 such as a RAM. The function of the waveform record unit 36 is realized by the processing in S130.

Next, in S140, the logical value of the signal waveform recorded in the memory 37 in S130 is compared with the logical value of a specific bit; a period(s) in which the logical value matches during the period of one bit during high-speed communication is extracted. Specifically, the periods A, B, C, and illustrated in the lower part of FIG. 3 are extracted.

Then, in S150, among the periods A, B, C, and D extracted in S140, the period D in FIG. 3 is selected as a period in which the logical value of the signal waveform matches the logical value of the specific bit for the longest period. The center of the period is then determined as the sampling point P2 of each bit in the data phase in which high-speed communication is performed. The function of the sampling point calculation unit 38 is realized by the processing in S140 and S150.

In response to that the sampling point P2 is determined in S150, the process proceeds to S160, where it is determined whether the reception of the arbitration phase (i.e., the data reception by the low-speed communication) has been completed from the reception data obtained by the sampling operation in the reception unit 32.

When it is determined in S160 that the reception of the arbitration phase has been completed, the process proceeds to S170. When not, the determination processing of S160 is performed again, thereby waiting for completing the reception of the arbitration phase.

In S170, since the data reception by the low-speed communication has been completed, the reception unit 32 is caused to start sampling the reception signal RX at the sampling point P2 in the high-speed communication determined in S150, thereby performing the data phase following the arbitration phase. That is, the communication speed of data reception is switched from low speed to high speed.

Next, in S180, it is determined whether reception of the data phase, that is, data reception by high-speed communication, has been completed based on the reception data obtained by the sampling operation in the reception unit 32.

If it is determined in S180 that the reception of the data phase has been completed, the process proceeds to S190, and if not, the determination processing in S180 is performed again to wait for the completion of the reception of the data phase.

In S190, since the data reception by the high-speed communication has been completed, the reception unit 32 is caused to start sample the reception signal RX at the sampling point P1 in the low-speed communication, thereby starting the reception of the arbitration phase following the data phase to thereby end the present reception process.

[1-4. Effect]

As described above, the communication apparatus 10 according to the present embodiment receives the differential signal Vdiff transmitted with the communication speed switched between the low speed state and the high speed state, and decodes the received data. In such receiving and decoding, the communication apparatus 10 detects a signal waveform of a specific bit, the logical value of which is already known, from among the received data obtained during the low-speed communication.

Then, by comparing the logical values of the recorded signal waveform with the logical value of the specific bit, a period(s) in which the logical values match within a 1-bit period during high-speed communication is extracted. Then, within the extracted periods, the sampling point P2 in the high-speed communication is determined.

Therefore, according to the communication apparatus 10 of the present embodiment, even if the communication speed of the communication data transmitted from the transmission nodes 4 to 6 is switched from a low speed state to a high speed state, the communication data can be restored normally without being affected by ringing.

[2. Other Embodiments]

Although the embodiment of the present disclosure has been described above, the present disclosure is not limited to the above embodiment, and can be implemented with various modification examples.

[2-1, First Modification Example]

For example, in the above embodiment, the sampling point determination unit 34 is provided in the control circuit 30 as a communication controller, and the sampling point P2 for high-speed communication is set in the control circuit 30.

Figure 6:
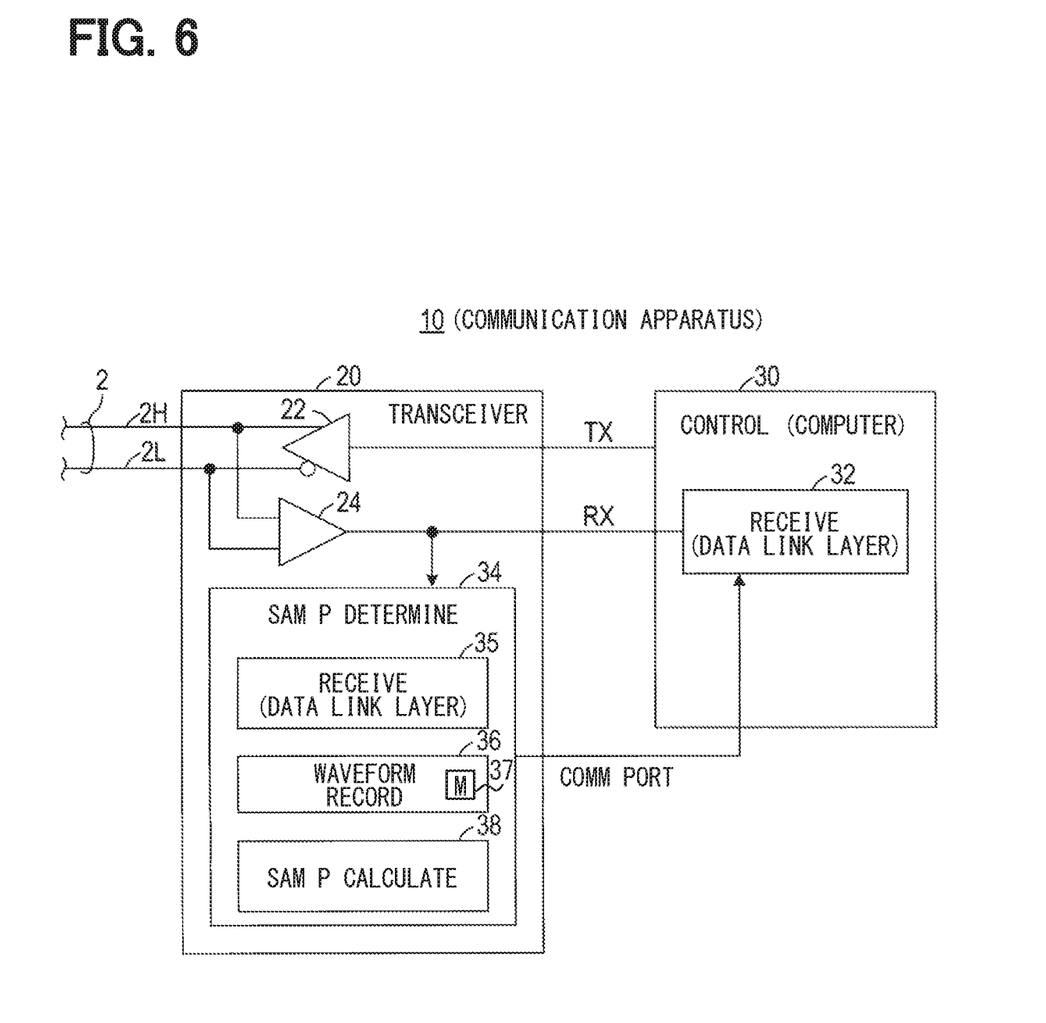
FIG. 6 is a block diagram illustrating another configuration example of a communication apparatus.

On the other hand, as shown in FIG. 6, the sampling point determination unit 34 may be provided in the transceiver 20, and notifies the reception unit 32 in the control circuit 30 of the sampling point P2 via a communication port. Note that the sampling point determination unit 34 may include the functions and configuration equivalent to those of the sampling point determination unit 34 in the first embodiment. In this case, the transceiver 20 needs to include a reception unit 35 for data link layer; the reception unit 35 is configured to decode at least the reception data in the low-speed communication by sampling the reception signal RX output from the reception circuit 24 in the transceiver 20. The reception unit 35 may be provided to be equivalent to the reception unit 32. In contrast, in the present modification example, as an example, the reception unit 35 may be provided to be included in the sampling point determination unit 34, along with the waveform record unit 36 and the sampling point calculation unit 38.

[2-2, Second Modification Example]

Next, in the embodiment described above, the sampling point P2 for high-speed communication is set every time a communication signal is received from the transmission nodes 4 to 6.

On the other hand, the sampling point P2 in the high-speed communication may be set for each of the transmission nodes 4 to 6 for a certain period of time after the communication system is constructed or changed. That is, the ringing generated in the communication signals from the transmission nodes 4 to 6 occurs according to the transmission characteristics of the communication signals from the respective transmission nodes 4 to 6 to the reception node 8.

Therefore, if the communication apparatus 10 serving as the reception node 8 sets the sampling point P2 for each of the transmission nodes 4 to 6, it is not necessary to set the sampling point P2 every time a communication signal is received.

Figure 7:
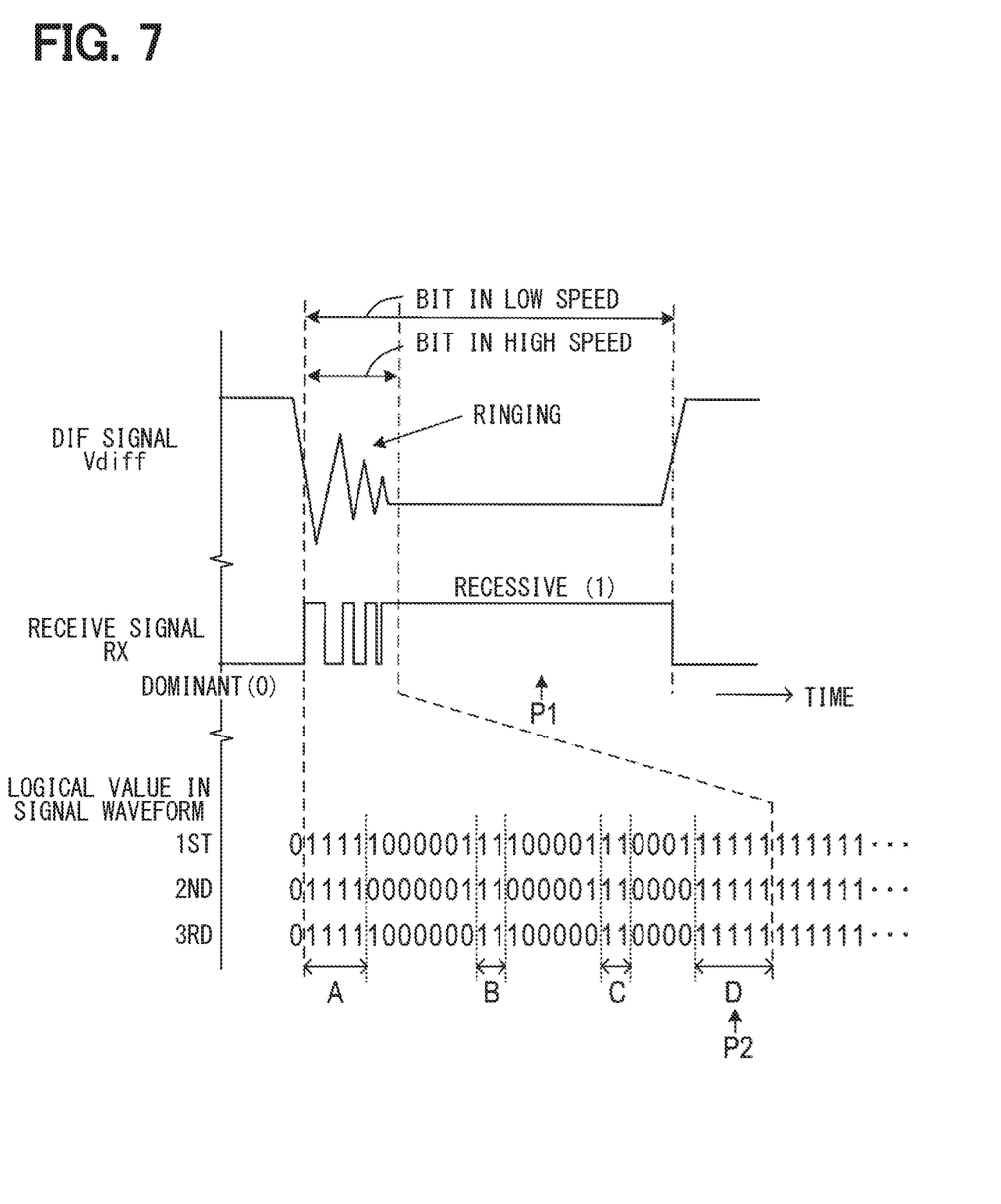
FIG. 7 is an explanatory diagram illustrating a technique for setting a sampling point according to a modification example.

In addition, when the sampling point P2 is set for each of the transmission nodes 4 to 6, the communication signals may be received a plurality of times for each of the transmission nodes 4 to 6, as illustrated in the lower part of FIG. 7.

Then, the sampling point P2 may be determined from the periods A to D in which the logical values of all the signal waveforms match the logical value of the specific bit, based on the acquired signal waveforms.

That is, in this way, the sampling point P2 can be set for each of the transmission nodes 4 to 6 without being affected by the fluctuation (i.e., jitter) of the signal waveform that occurs each time a communication signal is received.

The following will describe an example of the reception process executed when the sampling point P2 is set for each of the transmission nodes 4 to 6. Note that this reception process is executed by the control circuit 30 (e.g., CPU in the control circuit 30) in order to realize the function as the sampling point determination unit 34.

Figure 8:
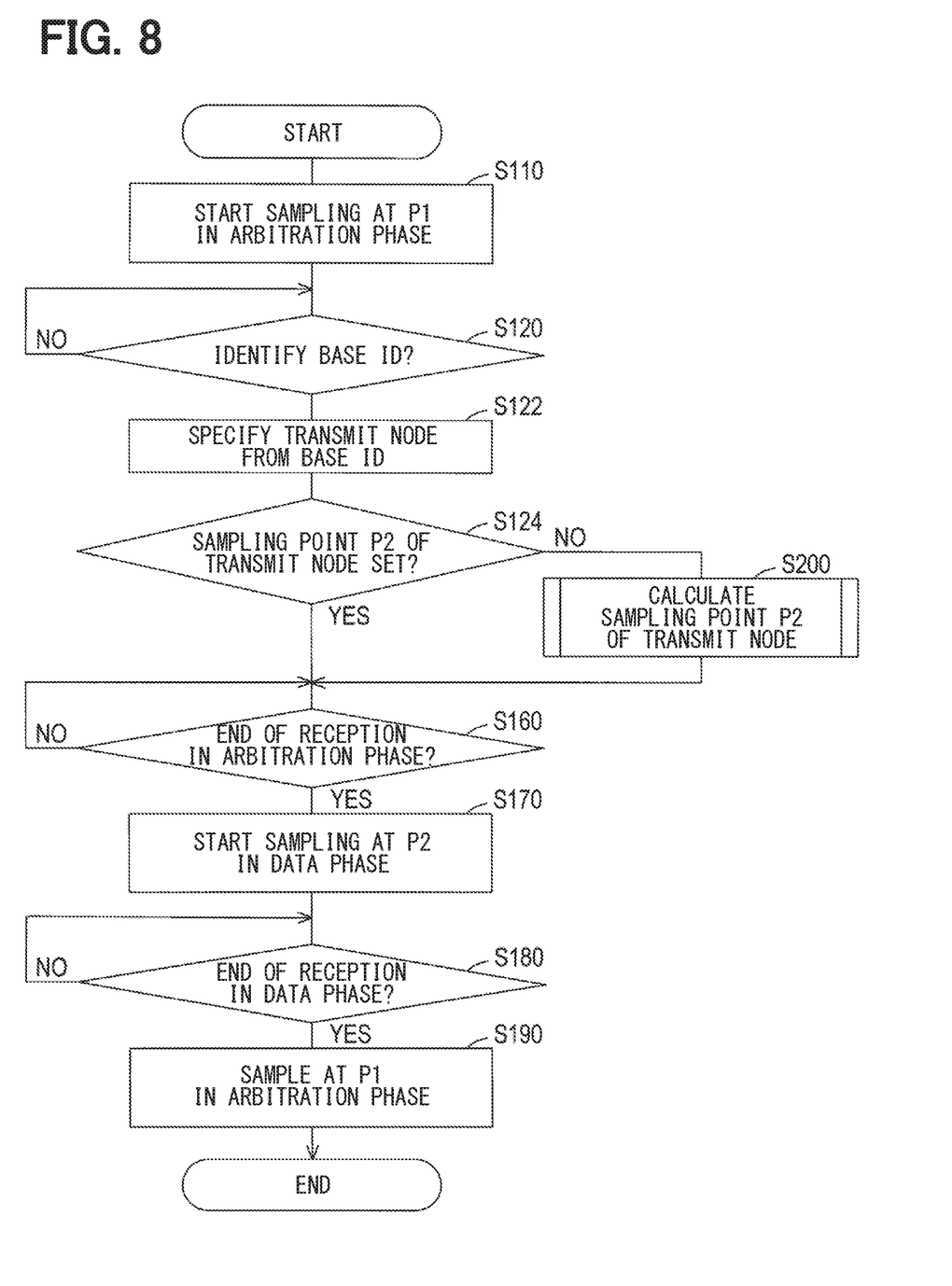
FIG. 8 is a flowchart illustrating a reception process according to the modification example.

As shown in FIG. 8, in this reception process, similarly to the reception process shown in FIG. 5, in S110, the reception unit 32 samples the reception signal RX at the preset sampling point P1 in the low-speed communication.

Then, in S120, it is determined whether the "BASE ID" has been identified from the reception data obtained by the sampling operation in the reception unit 32, causing the process to stand by until the "BASE ID" is received.

If it is determined in S120 that the "BASE ID" has been identified, the process proceeds to S122, where the transmission node that has transmitted the communication signal is specified from the "BASE ID". In S124, it is determined whether the sampling point P2 has been set for the specified transmission node.

If it is determined in S124 that the sampling point P2 has been set, the process proceeds to S160. If it is determined that the sampling point P2 has not been set, the process proceeds to S200. Then, in S200, a calculation process for calculating the sampling point P2 for the specified transmission node is executed.

Figure 9:
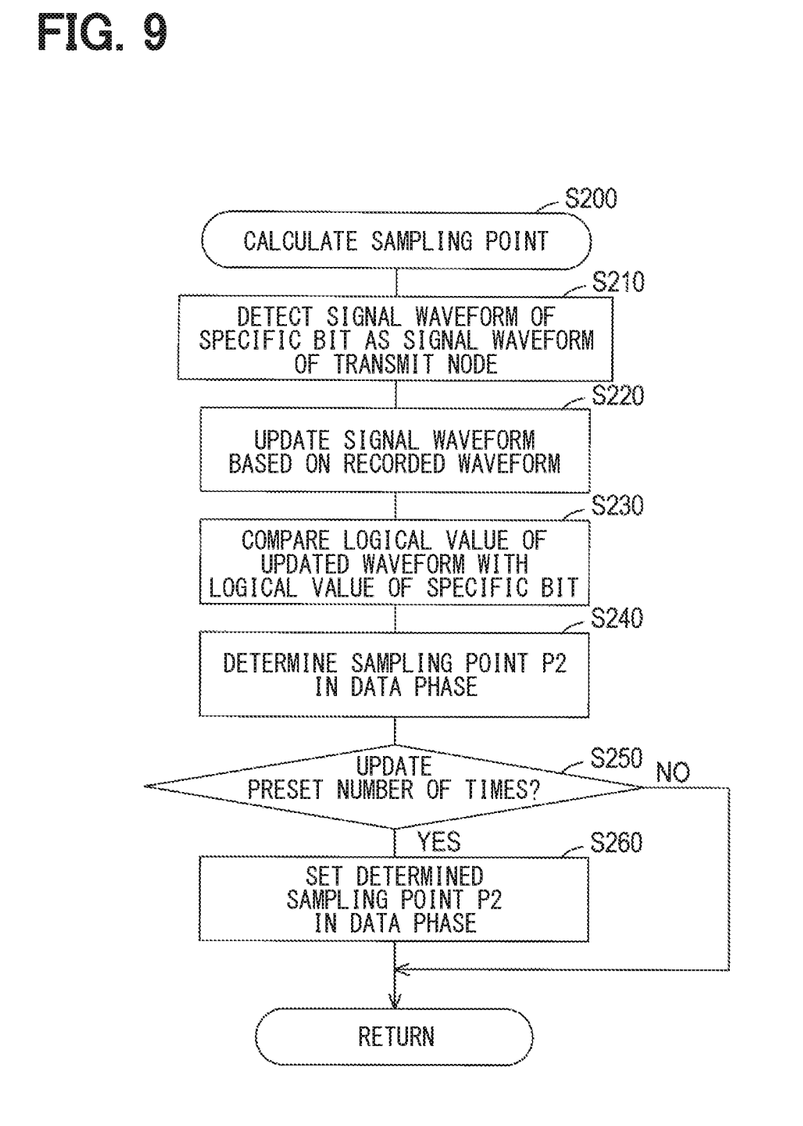
FIG. 9 is a flowchart illustrating a sampling point calculation process according to the modification example.

In the calculation process in S200, as shown in FIG. 9, first, in S210, a signal waveform of a specific bit (i.e., "FDF" bit) received after identification of the "BASE ID" is detected and is stored in the memory 37 such as a RAM, as the signal waveform of the transmission node specified in S122. That is, in S210, a signal waveform is recorded for each transmission node.

Next, in subsequent S220, the signal waveform used for calculating the sampling point P2 of the transmission node is updated based on the signal waveform recorded in S210. In S220, if the signal waveform for calculating the sampling point has not been recorded yet, the signal waveform stored in the memory 37 in S210 is recorded as it is as the signal waveform for calculating the sampling point.

If a signal waveform for sampling point calculation has already been recorded, the recorded signal waveform is compared with the signal waveform stored in the memory 37 in S210. If there is a non-matching logical value in both signal waveforms, the non-matching logical value is set to a logical value different from the logical value of the specific bit, and the signal waveform for sampling point calculation is updated.

As a result, the signal waveform for the sampling point calculation is updated for each transmission node such that all of the signal waveforms have the same logical value as that of the specific bit. When the signal waveform for the sampling point calculation of the transmission node is updated in this way, the process proceeds to S230. In S230, the logical values of the updated signal waveform are compared with the logical value of a specific bit; then, periods are extracted in which the logical values of the updated signal waveform match the logical value of the specific bit within one bit in the high-speed communication.

In S240, a period in which the logical values of the signal waveforms match the logical value of the specific bit longest is selected from among the periods extracted in S230, and the center in the selected period is determined as the sampling point P2 for the data phase transmitted from the transmission node specified in S122.

Next, in S250, it is determined whether the update of the signal waveform for the transmission node of the signal waveform in S220 at the present time has been performed at least a predetermined number of repetition times. If the signal waveform for the transmitting node has been updated a predetermined number of repetition times or more, the process proceeds to S260.

Then, in S260, the sampling point P2 determined in S240 is set as the sampling point P2 for thereafter receiving communication data from the transmission node specified in S122, and the process returns to S200 in FIG. 8.

Also, if it is determined in S250 that the signal waveform has not been updated to the transmission node a predetermined number of repetition times or more, the process returns to S200 in FIG. 8.

Next, in S160 of FIG. 8, similarly to the reception process shown in FIG. 5, it is determined whether the reception of the arbitration phase, that is, the data reception by the low-speed communication has been completed to thereby wait for the completion of the reception in the arbitration phase.

Then, if it is determined in S160 that the reception of the arbitration phase has been completed, the processing in S170 to S190 is then executed. The reception unit 32 is thereby caused to decode sequentially the data transmitted from the transmission node by the high-speed communication and the low-speed communication, and the reception process is ended.

[Other Modification Examples]

In the sampling point calculation process shown in FIG. 9, a signal waveform of a specific bit obtained from the reception signal RX is detected for each transmission node, and a signal waveform for calculating the sampling point P2 is updated based on the detected signal waveform.

On the other hand, a signal waveform of a specific bit obtained from the reception signal RX may be detected a predetermined number of repetition times for each transmission node. From among the plurality of detected signal waveforms, a period may be extracted in which its logical value and the logical value of the specific bit are the same in all the signal waveforms; thereby a sampling point P2 is determined based on the extracted period.

In the above-described embodiment and the modification examples, a period is selected in which the logical value of a signal waveform and the logical value of a specific bit match the longest within a 1-bit period during high-speed communication; then, the sampling point P2 in the high-speed communication is set to a center in the selected period.

On the other hand, the sampling point P2 in the high-speed communication may be set to a specific position in the selected period in which the logical value of the signal waveform and the logical value of the specific bit match the longest. Further, among the periods in which the logical values of the signal waveform and the logical value of the specific bit match, the first to third longest periods may be selected, and the centers of the respective periods may be set as the sampling points P2.

In this case, in the high-speed communication, of the logical values obtained at the respective sampling points P2, the logical value that matches at two sampling points P2 may be specified as the logical value of the corresponding bit.

In addition, the sampling point P2 in the high-speed communication may be set in the last period of one bit among the periods in each of which the logical value of the signal waveform matches the logical value of a specific bit in the high-speed communication.

Further, in the above embodiment and the modification examples, the sampling point P2 in the high-speed communication is set based on the signal waveform of a bit with a logical value that has undergone an inverse change in which communication data changes from a dominant of logical value "0" to a recessive of logical value "1" in the low-speed communication.

On the other hand, the sampling point P2 in the high-speed communication may be set based on (i) the signal waveform of the bit with a logical value having undergone an inverse change in which the communication data changes from dominant to recessive and (ii) the signal waveform of the bit with a logical value having undergone an inverse change in which the communication data changes from recessive to dominant.

In this case, for example, for each signal waveform when the communication data changes in each of the above directions, periods are extracted in each of which the logical value of the signal waveform matches the logical value of the bit in the low-speed communication; then the sampling point P2 may be set within the extracted periods overlapping.

Further, in the above-described embodiment and the modification examples, the signal waveform recorded in the memory 37 by the waveform record unit 36 is described as a signal waveform of a specific bit. There is no need to be limited thereto. That is, only the signal waveform in the period corresponding to one bit in the high-speed communication may be recorded in the memory 37.

Further, in the above embodiments and modification examples, the communication apparatus 10 having the functions of the transmission nodes 4 to 6 and the reception node 8 has been described as an example of the communication apparatus of the present disclosure. There is no need to be limited thereto. That is, the communication apparatus according to the present disclosure may be configured as a reception node 8 dedicated to data reception.

Next, in the above embodiment, the functions as the waveform record unit 36 and the sampling point calculation unit 38 have been described as being realized by the CPU executing the reception process shown in FIG. 5 or FIGS. 8 and 9.

However, these functions do not necessarily need to be realized by a computer program executed by the CPU, and may be realized by hardware configured by various logic circuits or a combination of hardware and a computer program.

In other words, the control circuit 30 and methods described in the above embodiment and modification examples may be implemented by one or more special-purpose computers. Such computers may be created (i) by configuring a memory and a processor programmed to execute one or more particular functions embodied in computer programs, or (ii) by configuring a processor provided by one or more special purpose hardware logic circuits, or (iii) by configuring a combination of (a) a memory and a processor programmed to execute one or more particular functions embodied in computer programs and (b) a processor provided by one or more hardware logic circuits.

The computer programs may be stored, as instructions being executed by a computer, in a tangible non-transitory computer-readable storage medium.

Further, a plurality of functions of one element in the above embodiment may be realized by a plurality of elements or one function of one element may be realized by a plurality of elements. Also, a plurality of functions of a plurality of elements can be realized by one element, or one function realized by a plurality of elements can be realized by one element. Further, a part of the configuration of the above embodiment may be omitted. Further, at least a part of the configuration of the above-described embodiment and modification examples may be added to or replaced by the configuration of another above-described embodiment and modification examples.

For reference to further explain features of the present disclosure, the description is added as follows.

In a communication apparatus, at the time when the signal level of the communication signal changes from high to low or from low to high, a part of the signal energy is reflected to cause the received signal to exhibit an overshoot or undershoot to generate a waveform distortion.

This waveform distortion is so-called ringing. When ringing occurs, the communication data may not be normally restored on the receiving side of the communication apparatus. Therefore, in order to suppress an occurrence of ringing, a switching element may be provided between a pair of communication lines that transmit a differential signal as a communication signal. This switching element is to be turned on for a certain period of time when a signal level of a differential signal changes.

That is, the above technique suppresses an occurrence of ringing by reducing the impedance between the communication lines and absorbing the distortion energy of the differential signal.

The above-mentioned technique may suppress all ringing in an ideal state; however, it may be difficult to suppress all ringing due to variations in characteristics of communication apparatuses and wire harnesses or due to on timing of the switching element. In some cases, the effect of ringing may thus remain. In particular, as the communication speed becomes higher, its influence on sampling points becomes more. This poses an issue.

It is thus desired to provide a communication apparatus capable of accurately restoring data without being affected by ringing even if a communication speed is switched to higher speed in the case of restoring data from the communication signal transmitted with the communication speed switched.

An aspect of the present disclosure described herein is set forth in the following clauses.

According to an aspect of the present disclosure, a communication apparatus is provided for receiving, via a transmission path, a communication data transmitted from a plurality of transmission nodes to a transmission path common to each transmission node. The communication apparatus includes a reception unit, a waveform record unit, and a calculation unit.

Note that in a communication system using the communication apparatus of the present disclosure, a communication data is transmitted from a plurality of transmission nodes, the communication data having a frame structure in which an arbitration area is added before a data area. When a plurality of transmission nodes simultaneously start transmission, one transmission node acquires a transmission right in the arbitration area and continues transmission of communication data. The communication speed is switched to make the speed higher in the data area.

Here, the reception unit is configured to sample a communication signal flowing through the transmission path at a predetermined sampling point and decode a logical value of each bit of the communication data. The waveform record unit is configured to record a signal waveform of the communication signal.

The calculation unit is configured to detect a specific bit from a communication data decoded by the reception unit in the low speed state of the communication speed and to acquire a signal waveform of the communication signal, which is recorded in the waveform record unit and corresponds to the specific bit. Herein, the specific bit is defined as a bit having undergone an inverse change in a logical value (i.e., the specific bit has a logical value that is in inverse relation to a logical value of a previous bit immediately before the specific bit).

The calculation unit is further configured to calculate a sampling point for each bit of the communication signal in the high speed state of the communication speed based on the acquired signal waveform and the logical value of the specific bit. Further, the reception unit is configured to sample the communication signal at the sampling point calculated by the calculation unit and to decode a logical value of each bit of the communication data in the high speed state of the communication speed.

That is, when the communication speed of communication data is switched within one frame, the communication time per bit is different between the low-speed communication and the high-speed communication: the communication time per bit is longer in the low-speed communication than in the high-speed communication. Note that the ringing occurs immediately after the logical value of the communication data changes from "1" to "0" or from "0" to "1".

Therefore, in the low-speed communication, the sampling point is set so as to sample the communication signal in the latter half area of one bit so as to avoid the area where ringing may occur. The communication data in the low-speed communication may be thus received without being affected by ringing.

In contrast, the period of one bit is shorter in the high-speed communication than in the low-speed communication. It is thus necessary to set the sampling point of the communication signal with a shorter time interval in the high-speed communication than in the low-speed communication. In addition, the ringing may be caused by reflection of transmission signals generated in each part of the transmission line, regardless of the communication speed. If the ringing occurs during the high-speed communication, the signal level, and consequently the logical value, may thus change over almost the entire period of one bit.

Therefore, in the communication apparatus according to the aspect of the present disclosure, the calculation unit detects a specific bit in the low-speed communication and acquires (i) a signal waveform when the specific bit is received and (ii) a logical value of the specific bit.

The specific bit is defined as a bit having undergone an inverse change in a logical value. In other words, the logical value of a specific bit is in inverse relation to the logical value of a previous bit immediately before the specific bit, or the logical value of the specific bit has been inverted or changed from the logical value of the previous bit. That is, when the previous logical value of the previous bit is "0", the present logical value of the specific bit is "1"; when the previous logical value of the previous bit is "1", the present logical value of the specific bit is "0".

Then, based on the acquired signal waveform of the specific bit and the logical value of the specific bit, the calculation unit sets a sampling point of a communication signal required for accurately decoding a logical value for each bit from a communication signal in the high-speed communication.

That is, a communication apparatus according to the aspect of the present disclosure is employed in a communication system in which a communication signal is transmitted from a transmission node with a communication speed switched within one frame. Such a communication apparatus according to the aspect of the present disclosure can restore a communication data normally without being affected by ringing even if the communication speed is switched to a higher speed.

What is claimed is:

1. A communication apparatus in a communication system in which
   (i) the communication apparatus is configured to receive a communication data transmitted from each of a plurality of transmission nodes to a transmission path common to the plurality of transmission nodes, the communication data having a frame structure in which an arbitration area is provided before a data area,
   (ii) each of the plurality of transmission nodes switches a communication speed between a low speed state in the arbitration area and a high speed state in the data area, and
   (iii) in response to the plurality of transmission nodes each starting transmitting the communication data in the arbitration area, a transmission node among the plurality of transmission nodes acquires a transmission right in the arbitration area and the transmission node acquiring the transmission right continues transmitting the communication data,
   the communication apparatus comprising:
   a reception unit configured
     to sample a communication signal flowing through the transmission path at a predetermined sampling point and
     to decode a logical value of each bit of the communication data;
   a waveform record unit configured to record a signal waveform of the communication signal; and
   a calculation unit configured
     to detect a specific bit from the communication data decoded by the reception unit in the low speed state of the communication speed, the specific bit being a bit having undergone an inverse change in the logical value,
     to acquire the signal waveform of the communication signal, which is recorded in the waveform record unit and corresponds to the specific bit, and
     to calculate the sampling point for each bit of the communication signal in the high speed state of the communication speed based on (i) the acquired signal waveform and (ii) the logical value of the specific bit,
   wherein the reception unit is configured, in the high speed state of the communication speed,
     to sample the communication signal at the calculated sampling point calculated by the calculation unit and
     to decode the logical value of each bit of the communication data.

2. The communication apparatus according to claim 1, wherein
   the waveform record unit is configured
     to detect a receiving period that is a period, in which the reception unit receives the specific bit in the arbitration area, based on the communication data decoded in the low speed state of the communication speed by the reception unit, and
     to record the signal waveform of the communication signal in the receiving period.

3. The communication apparatus according to claim 2, wherein the waveform record unit is configured
  to detect, in the arbitration area, the receiving period based on the communication data decoded in the low speed state of the communication speed by the reception unit, and
  to record the signal waveform of the communication signal in the receiving period,
wherein the receiving period appears after an arbitration period, which is needed for the transmission node acquiring the transmission right to acquire the transmission right within the arbitration area.

4. The communication apparatus according to claim 1, wherein
the calculation unit is configured
  to compare the logical value of the signal waveform that changes within a period of the specific bit with the logical value of the specific bit detected by the reception unit, and
  to determine the sampling point of the communication signal in the high speed state of the communication speed to be a point at which the logical value of the signal waveform matches the logical value of the specific bit.

5. The communication apparatus according to claim 4, wherein
the calculation unit is configured to determine the sampling point from a plurality of periods in each of which the logical value of the signal waveform matches the logical value of the specific bit.

6. The communication apparatus according to claim 1, wherein:
the waveform record unit is configured
  to specify, based on the communication data decoded in the low speed state of the communication speed by the reception unit, a transmission node having transmitted the communication data, and
  to record the signal waveform of the communication signal with respect to the specified transmission node having transmitted the communication data; and
the calculation unit is configured
  to specify, based on the communication data decoded in the low speed state of the communication speed by the reception unit, the specified transmission node having transmitted the communication data,
  to acquire the signal waveform of the specific bit that has been transmitted from the specified transmission node having transmitted the communication data, the acquired signal waveform being recorded in the waveform record unit, and
  to calculate the sampling point for each bit of the communication signal transmitted in the high speed state from the specified transmission node having transmitted the communication data based on the acquired signal waveform and the logical value of the specific bit decoded by the reception unit.

7. The communication apparatus according to claim 6, wherein
with respect to the specified transmission node having transmitted the communication data,
the waveform record unit is configured
  to acquire the signal waveform of the communication signal when the reception unit is receiving the specific bit as a plurality of signal waveforms corresponding to the logical values with respect to respective unit times, the unit time being shorter than a time of one bit in the high speed state of the communication speed, and
  to generate and record, based on the acquired plurality of signal waveforms, the signal waveform that is to be used by the calculation unit to calculate the sampling point.

8. The communication apparatus according to claim 7, wherein
with respect to the specified transmission node having transmitted the communication data,
each time acquiring the signal waveform of the communication signal when the reception unit receives the specific bit,
the waveform record unit is configured
  to compare the acquired signal waveform with the signal waveform already recorded as the signal waveform that is to be used by the calculation unit to calculate the sampling point,
wherein, in response to that there is the logical value that does not match in both the acquired signal waveform and the already recorded signal waveform,
the waveform record unit is configured
  to determine the logical value not matching to be different from the logical value of the specific bit decoded by the reception unit and
  to update the already recorded signal waveform.

9. A communication apparatus in a communication system in which
  (i) the communication apparatus is configured to receive a communication data transmitted from each of a plurality of transmission nodes to a transmission path common to the plurality of transmission nodes, the communication data having a frame structure in which an arbitration area is provided before a data area,
  (ii) each of the plurality of transmission nodes switches a communication speed between a low speed state in the arbitration area and a high speed state in the data area, and
  (iii) in response to the plurality of transmission nodes each starting transmitting the communication data in the arbitration area, a transmission node among the plurality of transmission nodes acquires a transmission right in the arbitration area and the transmission node acquiring the transmission right continues transmitting the communication data,
the communication apparatus comprising:
a computer including one or more processors configured
to sample a communication signal flowing through the transmission path at a predetermined sampling point,
to decode a logical value of each bit of the communication data,
to record a signal waveform of the communication signal,
to detect a specific bit from the communication data decoded in the low speed state of the communication speed, the specific bit being a bit having undergone an inverse change in the logical value,
to acquire the signal waveform of the communication signal, which is recorded and corresponds to the specific bit, and
to calculate the sampling point for each bit of the communication signal in the high speed state of the communication speed based on (i) the acquired signal waveform and (ii) the logical value of the specific bit,
wherein in the high speed state of the communication speed:
the communication signal is sampled at the calculated sampling point, and the logical value of each bit of the communication data is decoded.

\* \* \* \* \*